(12) United States Patent
Hayashi

(10) Patent No.: US 6,393,263 B1
(45) Date of Patent: May 21, 2002

(54) MOBILE COMMUNICATIONS TERMINAL AND SYSTEM WITH OFFSET TIME FEATURE

(75) Inventor: Keisaku Hayashi, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/251,749

(22) Filed: Feb. 18, 1999

(30) Foreign Application Priority Data

Feb. 19, 1998 (JP) .......................................... 10-037572

(51) Int. Cl.⁷ ................................................ H09B 1/38
(52) U.S. Cl. ......................... 455/145; 455/566; 368/21; 368/22
(58) Field of Search ................................. 455/550, 422, 455/566, 502, 145, 418, 419, 414, 575; 368/22, 81, 47, 51, 10, 13

(56) References Cited

U.S. PATENT DOCUMENTS

| | | | |
|---|---|---|---|
| 4,884,254 A | * 11/1989 | Kawai et al. | 368/21 |
| 5,089,814 A | * 2/1992 | DeLuca et al. | 340/825.49 |
| 5,257,406 A | * 10/1993 | Ito | 455/56.1 |
| 5,258,964 A | * 11/1993 | Koma et al. | 368/47 |
| 5,375,104 A | * 12/1994 | Ishii et al. | 368/22 |
| 5,455,807 A | * 10/1995 | Nepple et al. | 368/47 |
| 5,521,887 A | * 5/1996 | Loomis | 368/47 |
| 5,528,558 A | * 6/1996 | Mardhekar et al. | 368/10 |
| 5,544,041 A | * 8/1996 | Nekkomoto | 705/1 |
| 5,561,701 A | * 10/1996 | Tchikawa | 379/57 |
| 5,995,846 A | * 11/1999 | Jakobsen | 455/517 |
| 6,166,651 A | 12/2000 | Kushita | 340/825.44 |

FOREIGN PATENT DOCUMENTS

| | | |
|---|---|---|
| EP | 818 720 | 1/1996 |
| GB | 2 313 461 | 11/1997 |
| JP | A-4-230890 | 12/1991 |
| JP | A-4-83196 | 3/1992 |
| JP | A-5-60882 | 3/1992 |
| JP | A-4-119020 | 3/1992 |
| JP | 6-268567 | 9/1994 |
| JP | 9-197070 | 7/1997 |
| JP | A-9-322219 | 12/1997 |
| JP | A-10-178666 | 6/1998 |

* cited by examiner

Primary Examiner—William Trost
Assistant Examiner—Congvan Tran
(74) Attorney, Agent, or Firm—Harness, Dickey & Pierce, PLC

(57) ABSTRACT

A mobile communications terminal and system in which a time displayed by the terminal can be corrected based on a reference time, while an intentional offset time can be established at the terminal without modification of the reference time itself. When a reference time (Tst) is 12:00, a user may purposely make a setting of, for example, 12:05 as a present time (RTC) generated by a time-generating portion. Accordingly, when the reference time (Tst) reaches 13:00, the present time (RTC) generated by the time-generating portion should be 13:05 unless deviation has occurred. Consequently, when the present time (RTC) is, for example, 13:04, correction is necessary. However, correction of the reference time (Tst) 13:00 itself fails to take into consideration the intentional five-minute advance, and so the reference time (Tst) of 13:00 is corrected with an added differential (Δt) of five minutes to 13:05.

32 Claims, 3 Drawing Sheets

MOBILE COMMUNICATIONS TERMINAL AND SYSTEM WITH OFFSET TIME FEATURE

CROSS-REFERENCE TO RELATED APPLICATION

The present application is related to, and claims priority from, Japanese Patent Application No. Hei. 10-37572, the contents of which are incorporated herein by reference.

BACKGROUND OF THE INVENTION

1. Technical Field

The present invention relates generally to a mobile communications system including a terminal such as a portable telephone, and particularly to a mobile communications terminal and system in which a time displayed by the terminal can be corrected based on a reference time, while an intentional offset time can be established at the terminal without the need to modify the reference time itself.

2. Related Art

Recently, the proliferation of mobile communications terminals such as cellular telephones and personal handyphone system (PHS) telephones has resulted in the demand for additional functions other than the basic functions of such terminals. A clock function may be considered as a general example of such an addition function. In particular, a clock function enables the terminal to display the present time, sound an alarm when a preset time is reached, or the like. In a mobile communications terminal including a time-generating unit, the terminal displays the time generated by the time-generating unit.

However, the time generated by the time-generating unit may deviate from a reference time because of, for example, removal and attachment of the battery supplying electrical power to the time-generating unit, or due to the limited accuracy of the time-generating unit itself. Consequently, correction based on a reference time is preferred to correct any such deviation.

Nonetheless, a user may have a habit of, for example, setting a time with an offset, such as purposely setting the time five minutes ahead. If the displayed time is corrected merely by matching the displayed time to the reference time, the user's offset time is lost.

When a mobile communications terminal does not include a time-generating unit, it is sufficient that the reference time be displayed. The reference time requires no correction, but the reference time itself cannot be changed according to the user's circumstances as described above. For this reason, when an externally-provided reference time is used, a user cannot perform an operation such as purposely setting the time five minutes ahead.

SUMMARY OF THE INVENTION

In this regard, it is a first object of the present invention to provide a mobile communications system and terminal that achieve the above-discussed time correction based on a reference time, as well as enable an intentional offset time to be added to the displayed time if so desired, without a time correction function based on the reference time eliminating the offset time.

It is a second object of this invention to provide a mobile communications system which can also accommodate setting of an intentional offset time when time displayed at the terminal is based on an externally-provided reference time.

A mobile communications terminal devised to achieve the foregoing first object is in wireless communication with a base station or base stations connected to a predetermined telephone-line network, thus enabling the terminal to communicate with other terminals of like function. A differential-storing portion of the terminal stores a differential between a time generated by a time generating portion and a reference time stored in a time storage portion. A time-correcting portion corrects a time generated by the time-generating portion based on a differential stored in the differential-storing portion and a reference time stored in the time-storing portion.

Thus, it is possible for the time-generating portion of the present invention to revise the time in accordance with an instruction input via a revision-instruction input portion because, for example, a user may have a habit of setting the display time with an offset. Thus, when a terminal display time is generated by the time-generating portion, or when an alarm or the like is activated based on the generated time, the terminal display revision instruction input from the revision-instruction inputting portion factors both the user's intentional offset time and the reference time into the terminal display revision. In this regard, the present invention is devised to correct a terminal display time generated by the time-generating unit based on both the differential and the reference time.

It may be noted that the above-described reference time may be generated within the terminal, or acquired from an external source.

If the time is generated within the terminal, preferably a GPS (Global Positioning System) receiver receives signals from a GPS satellite, and a reference-time generating unit generates a reference time based on the received signal. Accordingly, this generated reference time may be stored in a reference-time storing portion.

If the time is acquired from an external source, preferably a receiver receives the reference time, and the received reference time is stored in the reference-time storing portion. When a cdmaOne system is utilized as a connection method, to communicate data for achieving synchronization between a mobile communications terminal and a base station, it is sufficient to have the reference time sent from the base station during data transmission. Further, the acquisition source may be something other than a base station. For example, a reference time is issued even in an electronic navigation system for a ship, and so a mode which performs direct reception from a base station or stations for such a communications system is also contemplated.

In view of the above, time with a desired offset can be displayed for a user's convenience even in a terminal not having a time-generating unit. Additionally, time-related processing is not exclusively limited to time display, but may be processing for example relating to sounding an alarm or the like when a set time is reached.

Accordingly, a mobile communications system may be provided with a mobile communications terminal and a base station or stations, where the base station is provided with a GPS-receiver to receive signals from a GPS satellite, a reference-time generating portion to generate the reference time based on a signal received by the GPS-receiving unit, and a transmitting unit to transmit a reference time generated by the reference-time generating portion to the mobile communications terminal. Of course, the base station itself may further be structured to receive a reference time from an external source.

A representative device wherein a mobile communications terminal according to the present invention is embodied may be a telephone apparatus for mobile-unit use, such as a portable telephone (what is known as a cellular telephone or a sub-unit for PHS use), a car telephone, or the like. Further, the present invention can be applied in a terminal such as pager having no telephone function.

DETAILED DESCRIPTION OF THE INVENTION

A first embodiment of the present invention will be described hereinafter with reference to the drawings. It should be appreciated that the present invention is not exclusively limited in any way to the embodiment described hereinafter, but can utilize various modes within the technical scope of the present invention.

Figure 1:
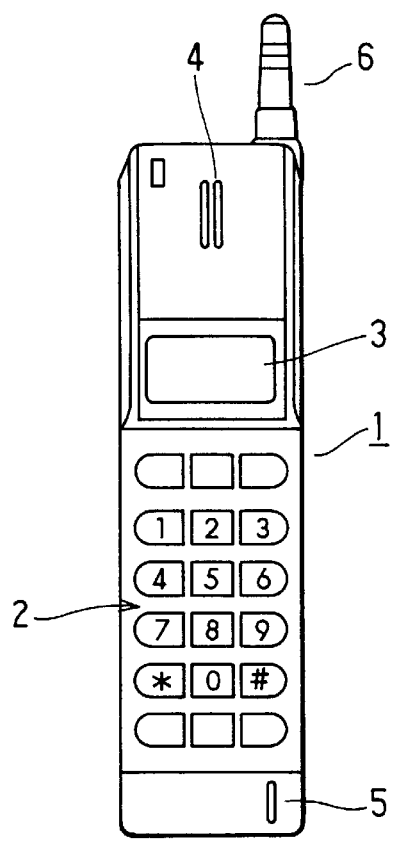
FIG. 1 is an external view of the telephone apparatus seen from the operating-portion side thereof.
Figure 2:
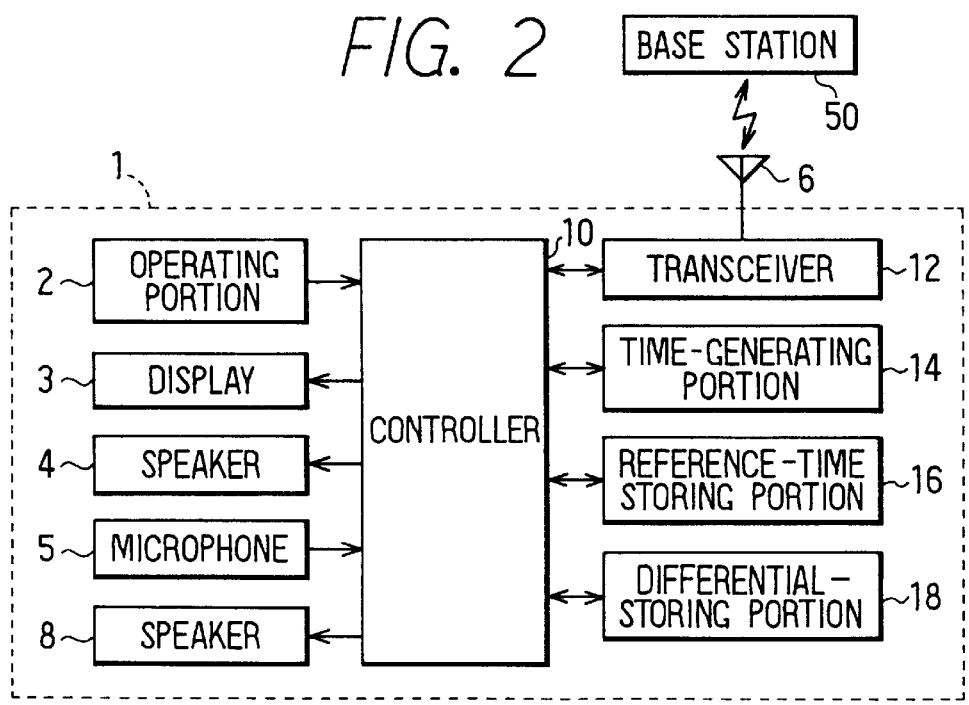
FIG. 2 is a block diagram depicting the internal configuration of a portable telephone apparatus in a mobile communications system of the present invention.

Referring first to FIGS. 1 and 2, the portable telephone apparatus 1 according to the present invention can be grasped and operated with one hand, and is both portable and convenient. An operating portion 2 including a numeric keypad is centrally located on a front face of the apparatus. The operating portion includes a numeric keypad including keys '0' through '9', '*', and '#' for entering the telephone number of a call destination, and a multiplicity of key switches made up of various function keys for switching the operating mode of the portable telephone apparatus 1 and for entering various instructions. A microphone 5 for input of a user's voice during a telephone call is disposed below the operation portion 2. A display 3 including a liquid-crystal display (LCD) for displaying messages sent from another telephone apparatus, operational guidance and running status for the portable telephone apparatus 1, and so on is disposed above the operating portion 2. A speaker 4 is disposed above the display portion 3 and is for outputting voice signals transmitted from another caller during a telephone call. A retractable rod antenna 6 is provided on an end portion above the speaker 4 to facilitate wireless communication with a base station on the telephone-line network side.

Figure 3:
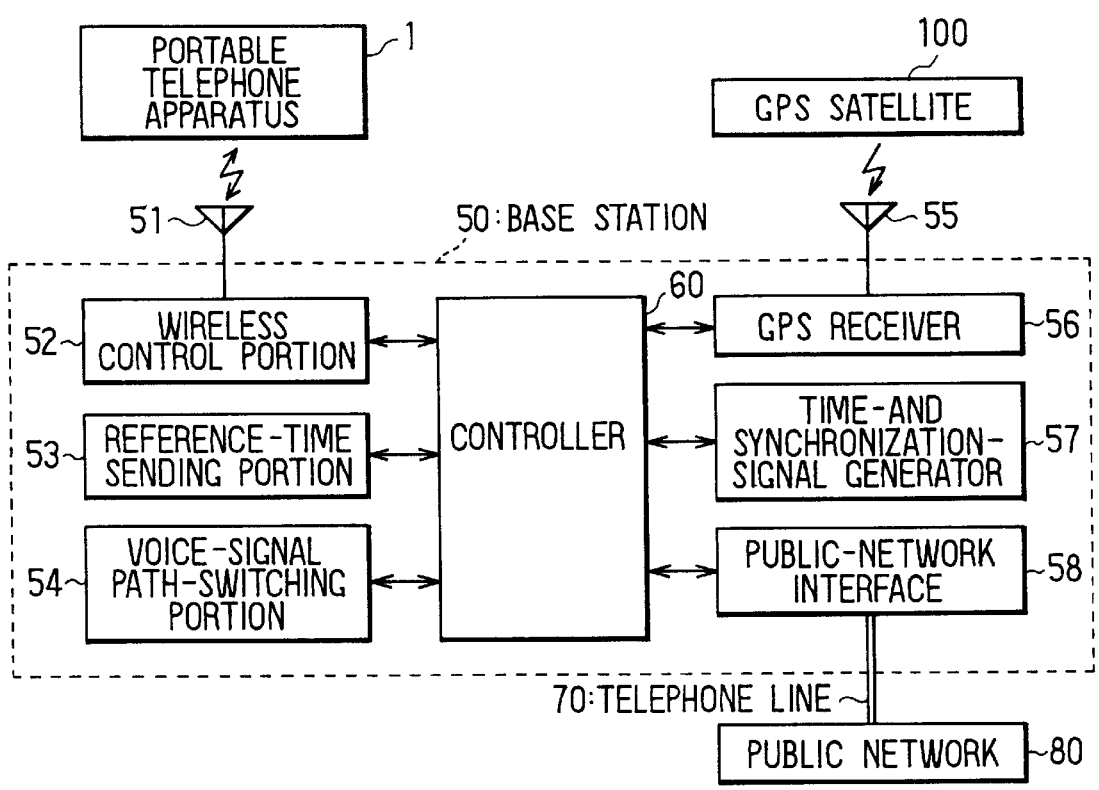
FIG. 3 is a block diagram depicting the internal configuration of a base station in a mobile communications system of the present invention.

Referring to FIG. 3, the numeric keypad is provided with the symbols '0' through '9', '*', and '#', and can be utilized by the user to purposely advance the time by, for example, five minutes ahead of the present time. Specifically, a function key may be operated to enable a time-revision mode. When a revision instruction is issued to change for example what is originally 12:00 to 12:05, a time which is five minutes early is generated as a result.

Also, as shown in FIG. 2, the portable telephone apparatus 1 is provided with an internal speaker 8 to generate an incoming-call sound when a call signal is sent from the telephone-line network, or to generate other types of advisory signals. Several other components are also disposed within the portable telephone apparatus 1. A transceiver 12 performs wireless communication with the base station 50 via the rod antenna 6. A time-generating portion 14 generates a present time (RTC). A reference-time storing portion 16 stores a reference time (Tst) sent from the base station 50. A differential-storing portion 18 stores a differential ($\Delta t$) between the above-described reference time (Tst) and the present time (RTC). Also, a controller 10 is connected to the foregoing several portions for performing various control processing.

The controller 10 is preferably a microprocessor including a CPU, ROM, RAM, and other well-known commercially available components, and executes various conventional portable telephone apparatus control processing. Namely, the controller 10 executes call-initiating processing to generate a call-initiating signal sent from the transceiver 12 to another telephone apparatus on the telephone-line network. The controller also generates an incoming-call signal causing the speaker 8 to output an audible sound when a call signal is sent from a base station. The controller also executes connection processing to connect the portable telephone apparatus 1 to the telephone-line network via the transceiver 12 when the user has entered an instruction to connect the portable telephone apparatus 1 to the telephone-line network due to generation of an incoming-call sound.

Further, the controller 10 executes voice input-output processing to transmit voice signals the user inputs from the microphone 5 from the transceiver 12 toward the base station 50, and to output the sound of a caller's voice from the speaker 4 when communication with the telephone apparatus of the called person is established, or when the portable telephone apparatus 1 is connected to the telephone-line network and communication with the telephone apparatus of the caller is established.

The controller 10 acquires the reference time (Tst) from the base station 50 (or, alternatively, from multiple base stations), stores the differential ($\Delta t$) between the reference time (Tst) and the present time (RTC), and corrects the present time (RTC) based on this reference time (Tst) and the differential ($\Delta t$) when executing data communication for achieving synchronization with the base station 50. This processing will be described later in detail.

Additionally, when a command to set the time has been entered via the operating portion 2, the controller 10 performs processing in accordance with the entered command. Specifically, a time reference may be set as desired, or a setting may be made so as to sound an audible alarm at a set time. When a time reference has been set, the time-generating portion 14 generates a new time referenced to this set time. When a user wishes to purposely set a time that is five minutes fast as was described above, an instruction may be entered via the operating portion 3, for example, to revise the time to 12:05 when the present time is 12:00. Thereafter, the controller 10 controls the time-generating portion 14 to generate a new time referenced to 12:05. If an alarm is set, the controller sets the audible alarm, referenced to the time generated by the time-generating portion 14. When the time is reached, the controller causes an audible alarm to be output from the speaker 8.

Meanwhile, the base station 50 according to the present invention bridges the portable apparatus and a public network 80, as shown in FIG. 3. The base station 50 includes a wireless controller 52 to perform wireless communication with the portable telephone apparatus 1 via an antenna 51 and to perform call control. The base station 50 also includes a reference-time sending portion 53 to send the reference time (Tst) to the portable telephone apparatus 1. Also, a voice-signal path-switching portion 54 connects a communication path between the portable telephone apparatus 1 and the public network 80. A GPS receiver 56 receives a radio transmission from a GPS satellite 100 via a GPS antenna 55. In addition, a time- and synchronization-signal generator 57 generates a present-time and synchronization signal. Further, a public-network interface 58 is connected to the public network 80 by a telephone line 70, and a controller 60 is connected to the foregoing several portions for performing various control processing.

The GPS receiver 56 preferably is a microprocessor including a CPU, ROM, RAM, as well as other well-known commercially available components, and acquires, from among signals received via the GPS antenna 55, reference-time data indicating signal-transmission time from the GPS satellite 100, time-difference data indicating time differences in received signals from a plurality of GPS satellites 100, and coordinate data. Accordingly, the GPS receiver determines GPS time by correcting the basic-time data with the time differential between the basic time utilized by the GPS satellite 100 and the time utilized at the present location. The GPS satellite 100 is provided with a source frequency standard (source time), and maintains accurate time known as GPS time. This time is sent to the ground once every predetermined time interval (for example 30 seconds). Consequently, the GPS receiver 56 determines the GPS time once every 30 seconds. Accordingly, the controller 60 corrects the time generated by the time- and synchronization-signal generator 57 based on the GPS time.

Additionally, the controller 60 is preferably a microprocessor including a CPU, ROM, RAM, and other well-known commercially available components, and executes various control processing to function as an ordinary base station. Namely, the controller 60 achieves synchronization with the portable telephone apparatus 1 via the wireless controller 52 and performs data transmission. When required, the controller 60 facilitates data transmission via the public-network interface 58 and the public network 80. As a result, communication between the portable telephone apparatus 1 in wireless communication with the base station 50 and, for example, another portable telephone apparatus 1 performing data communication with another base station is possible.

Acquisition of a reference time (Tst) from the base station 50 for performing time correction at the portable telephone apparatus 1 was described above. That is to say, the reference-time sending portion 53 sends the time generated by the time- and synchronization-signal generator 57 to the portable telephone apparatus 1 via the wireless controller 52 at the base station 50 when establishing synchronization with the portable telephone apparatus 1. This time is corrected by the GPS time as described above, and is sent to the portable telephone apparatus 1 as the reference time (Tst).

Processing relating to time correction executed in the controller 10 will be described with reference to the flow diagrams of FIGS. 4 and 5.

Figure 4:
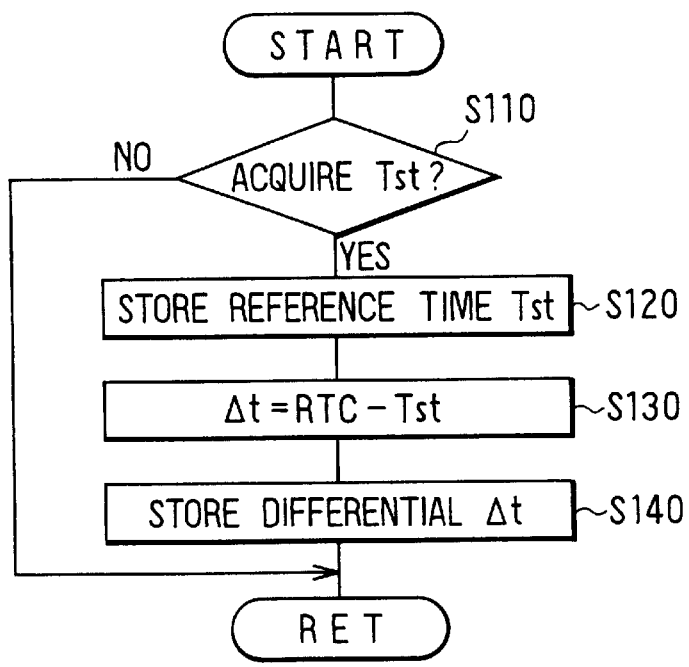
FIG. 4 is a flow diagram depicting differential-storage processing executed in the portable telephone apparatus.

FIG. 4 is a flow diagram of a differential storage processing routine executed during data communication for achieving synchronization with the base station 50. At step S110, it is determined whether the reference time (Tst) sent from the base station 50 has been acquired. When acquired (S110: YES), the reference time (Tst) is stored in the reference-time storing portion 16.

Next, the differential ($\Delta t$=RTC–Tst) between the present time (RTC) generated at the time-generating portion 14 and the reference time (Tst) stored in the reference-time storing portion 16 is calculated (S130). The differential ($\Delta t$) is stored in the differential-storing portion 18 at S140, and the routine ends.

The above processing is executed when the user sets the present time (RTC). The above processing is also executed when the present time (RTC) is set while out of transmission range and the reference time (Tst) is acquired for the first time upon moving into transmission range.

Figure 5:
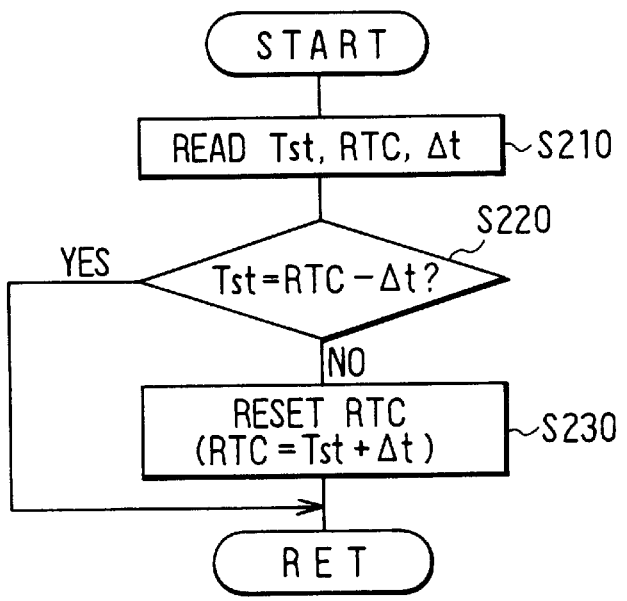
FIG. 5 is a flow diagram depicting time-correction processing executed in the portable telephone apparatus.

Next, FIG. 5 is a flow diagram indicating a time-correction processing routine executed, for example, once per second. The reference time (Tst) is initially read from the reference-time storing portion 16, the present time (RTC) is read from the time-generating portion 14, and the differential ($\Delta t$) is read from the differential-storing portion 18 (S210). Accordingly, it is determined whether the reference time (Tst) matches the present time (RTC) minus the differential ($\Delta t$); that is, whether Tst=RTC–$\Delta t$ (S220). When Tst=RTC–$\Delta t$ is not obtained (S220: NO), it is determined that a deviation has occurred in the present time (RTC), and the present time (RTC) is corrected. Specifically, the value equal to the reference time (Tst) plus differential ($\Delta t$) is set as the present time (RTC). Meanwhile, when Tst=RTC–$\Delta t$ is obtained (S220: YES), it is determined that there is no deviation in the present time (RTC), and the routine ends without performing correction.

According to the mobile communications system of the above-described first embodiment of the present invention, the portable telephone apparatus 1 stores the differential ($\Delta t$) for the present time (RTC) generated by the time-generating portion 14 and the reference time (Tst) acquired from the base station 50, and corrects the present time (RTC) based on the reference time (Tst) and the differential ($\Delta t$). When the present time (RTC) generated by the time-generating portion 14 deviates from the reference time (Tst) due for example to removal or attachment of a battery supplying electrical power to the time-generating portion 14, or due to the accuracy of the time-generating function itself, correction based on the reference time (Tst) is performed.

However, if the present time (RTC) generated by the time-generating portion 14 deviates from the reference time (Tst), the present time (RTC) can not necessarily be corrected merely by matching the present time (RTC) to the reference time (Tst). This is because a user may have a habit of, for example, setting a time with an offset, such as purposely setting the time five minutes ahead.

In this regard, the portable telephone apparatus 1 according to the present invention corrects the present time (RTC) based on the reference time (Tst) and the differential ($\Delta t$). As an example, when the reference time (Tst) is 12:00, the user may purposely make a setting of 12:05, which is five minutes early, as the present time (RTC) generated by the time-generating portion 14. Accordingly, when the reference time (Tst) reaches 13:00, the present time (RTC) generated by the time-generating portion 14 should be 13:05 unless deviation has occurred. Consequently, when for example the present time (RTC) generated by the time-generating portion 14 is 13:04, correction is necessary.

However, correction of the reference time (Tst) of 13:00 itself fails to factor the intentional five-minute advance into the correction, and so the reference time (Tst) of 13:00 is corrected to 13:05 with the added five-minute differential ($\Delta t$; refer to FIG. 5). This case raises a specific example of a delay of one minute per hour, but this is to facilitate understanding of the invention, and does not signify that deviation of this extent occurs in actuality.

In this way, the portable telephone apparatus 1 according to the present invention can achieve the above correction based on the reference time (Tst) while at the same time factoring in an intentional offset time.

A situation in which an offset time deviating from the reference time is set may include purposely setting a time advanced by five minutes based for example on the personal circumstances of the user, as in the foregoing example. However, implementation of a daylight-savings time system, a time-zone system, or the like in Europe or North America may also require an offset time to be set. Additionally, when a country or territory extends across multiple time zones, a standard time within a zone thereof is set, and a time difference is added with respect to a predetermined reference time.

Consequently, in an exemplary case, the differential (Δt) may be an offset time (Δt1) based on personal circumstances of the user, plus an offset time (Δt2) based on daylight-savings time, plus an offset time (Δt3) based on a particular time zone deviation from the reference time. The offset time (Δt2) based on daylight-savings time and the offset time (Δt3) based on the time zone of this example are uniform times set publicly, and not according to personal circumstances. As a modification for accommodating these in a simple manner, the user may enter a command via the operating portion 3 regarding whether to execute the offset for daylight-savings time use and for time-zone use, and need not enter a command for the time itself.

A first embodiment of the present invention has been described above, but additional embodiments will be described hereinafter.

1) With the above-described first embodiment, the portable telephone apparatus 1 is structured to receive the reference time (Tst) from the base station 50. However, the portable telephone apparatus may also be structured so that the reference time (Tst) is generated internally within the portable telephone apparatus 1. In such a case, the GPS time which the base station 50 generated in the first embodiment may be generated by the portable telephone apparatus 1. The method of time correction is similar.

However, the portable telephone apparatus 1 must consequently be provided with a GPS receiver, and so a configuration which acquires the reference time (Tst) from an external portion, as in the first embodiment, is more advantageous from the standpoint of compactness and simplicity. In particular, when a cdmaone is utilized as the connection method, the reference time (Tst) can be sent from the base station 50 while performing data communication for achieving synchronization between the portable telephone apparatus 1 and the base station 50.

2) In the first embodiment, the base station 50 generates the reference time (Tst), but the base station 50 may be alternately configured to acquire the reference time (Tst) itself from an external source.

Further, the present invention may also be configured such that the portable telephone apparatus 1 has the reference time (Tst) sent from other than the base station 50. For example, a reference time is issued even in an electronic navigation system for a ship, and so reception is directly from a broadcast station for such a communication system.

3) The first embodiment is what is termed an internal clock type apparatus, wherein the portable telephone apparatus 1 is assumed to have an internal time-generating portion 14. In contrast thereto, it is possible to receive the reference time (Tst) from an external source and display the reference time (Tst) on the display 3 even in an apparatus which does not have a time-generating portion 14.

If the apparatus does not include an internal clock, or time-generating unit, however, a display of time with the above-described offset time included is not possible without modifying the reference time itself. That is to say, to merely display the correct time, it is sufficient to display the reference time (Tst) without modification. However, the offset time cannot be factored into the displayed time without directly modifying the reference time itself. In this regard, the configuration described hereinafter may enable setting of an intentional offset time such as was described above, while being based on the reference time (Tst).

That is to say, a portable telephone apparatus may be configured as the above-described embodiment shown in FIG. 1, except without the time-generating portion 14. Accordingly, a reference time (Tst) received from the base station 50 is stored in the reference-time storing portion 16. Additionally, when the user has made a setting via the operating portion 2 with an offset time included, such as when a setting of 12:05 is made even though the present time is 12:00, a time (in this case, 5 minutes) obtained by subtracting the reference time (Tst) of 12:00 from the set time of 12:05 is stored in the differential-storing portion 18 as the differential (Δt). Accordingly, the controller 10 displays the reference time (Tst) with the differential (Δt) added when the time is displayed on the display portion 3.

As a result, time which includes the offset time can be displayed, and user convenience can be enhanced even in an apparatus not including an internal time-generating unit. Further, even when an audible alarm is set to sound at an alarm-set time, the alarm-set time references the time including the offset time set by the user as described above. Additionally, the reference time (Tst) in this case as well may be received from the base station 50 as in the above-described embodiment, or from a reference-time transmitting source.

4) The apparatus in each of the above-described embodiments was a portable telephone apparatus 1 configured as a mobile communications terminal. However, the present invention is not exclusively restricted to a portable telephone apparatus, but may be a telephone apparatus for mobile-unit use such as a car telephone or the like, or a non-telephone terminal such as a pager.

While the above description is of the preferred embodiments of the present invention, it should be appreciated that the invention may be modified without departing from the proper scope or fair meaning of the accompanying claims. Various other advantages of the present invention will become apparent to those skilled in the art after studying the foregoing text and drawings taken in conjunction with the following claims.

What is claimed is:

1. A mobile communications terminal, comprising:
   a terminal input for entering a time revision instruction for a terminal time by a user, said time revision instruction being a specific time deviation or a new selected time desired by the user;
   a generator in communication with the terminal input for generating a revised time in accordance with the time revision instruction;
   a first terminal storage portion for storing a reference time;
   a second terminal storage portion for storing a differential between the time generated by the generator and the reference time stored in the first terminal storage portion; and
   a controller for correcting a time generated by the generator based on the differential stored in the second terminal storage portion and the reference time stored in the second terminal storage portion;

wherein, even for a changing reference time, a constant time differential is maintained with the reference time by comparison with the generator, after the user inputs the specific time deviation or the new selected time, and the revision is repeated with the same specific time differential stored in the second terminal storage portion until another specific time differential or a new selected time is input by the user.

2. The mobile communications terminal of claim 1, further comprising:
a receiver for receiving a signal from a remote signal transmitter; and
a reference time generator for generating the reference time based on the signal received by the receiver;
wherein the reference time generated by the generator is stored in the first terminal storage portion.

3. The mobile communications terminal of claim 2, wherein the remote signal transmitter is a global positioning system satellite.

4. The mobile communications terminal of claim 1, further comprising:
a reference time receiver for receiving the reference time from an external source;
wherein the reference time received by the reference time receiver is stored in the first terminal storage portion.

5. The mobile communications terminal of claim 1, wherein the mobile communications terminal is in wireless communication with a mobile communications system, the mobile communications system comprising:
a signal receiver for receiving signals from a communications satellite;
a reference time generator for generating the reference time based on the signals received by the signal receiver; and
a transmitter for transmitting the reference time generated by the generator to the mobile communications terminal.

6. The mobile communications terminal of claim 5, wherein the first terminal storage portion is structured to receive the reference time from the mobile communications system.

7. The mobile communications terminal of claim 1, wherein the terminal input comprises a terminal keypad.

8. The mobile communications terminal of claim 1, wherein the terminal input comprises an externally-located transmitter.

9. The mobile communications terminal of claim 1, further comprising a generator located remotely from the terminal for generating the terminal time.

10. The mobile communications terminal of claim 1, further comprising a generator located within the terminal for generating the terminal time.

11. The mobile communications terminal according to claim 1, wherein said terminal input is a key pad wired to said first terminal storage portion.

12. A mobile communications terminal, comprising:
means for inputting a time revision instruction for a terminal time by a user, said time revision instruction being a specific time deviation or a new selected time desired by the user;
means for generating a revised time in accordance with the time revision instruction;
means for storing a reference time;
means for storing a differential between the time generated by the generator and the reference time stored in the first terminal storage portion; and
means for correcting a time generated by the generator based on the differential stored in the second terminal storage portion and the reference time stored in the second terminal storage portion;
wherein, even for a constantly changing reference time, a constant time differential is automatically maintained with the reference time, after the user inputs a revision instruction by generating a revised time based on the reference time and the differential.

13. The mobile communications terminal of claim 12, further comprising:
means for receiving a signal from a remote signal transmitter; and
means for generating the reference time based on the signal received by the receiving means;
wherein the reference time generated by the generating means is stored in the storing means.

14. The mobile communications terminal of claim 13, wherein the remote signal transmitter is a global positioning system satellite.

15. The mobile communications terminal of claim 12, further comprising:
means for receiving the reference time from an external portion;
wherein the reference time received by the receiving means is stored in the storing means.

16. The mobile communications terminal of claim 12, wherein the mobile communications terminal is in wireless communication with a mobile communications system, the mobile communications system comprising:
means for receiving signals from a communications satellite;
means for generating the reference time based on the signals received by the receiving means; and
means for transmitting the reference time generated by the generating means to the mobile communications terminal.

17. The mobile communications terminal of claim 16, wherein the storing means is structured to receive the reference time from the mobile communications system.

18. The mobile communications terminal of claim 12, wherein the means for inputting a time revision instruction comprises a terminal keypad.

19. The mobile communications terminal of claim 12, wherein the means for inputting a time revision instruction comprises an externally-located transmitter.

20. The mobile communications terminal of claim 12, further comprising means for generating the terminal time, the means for generating the terminal time being located remotely from the terminal.

21. The mobile communications terminal of claim 12, further comprising means located within the terminal for generating the terminal time.

22. A mobile communications terminal, comprising:
means for receiving a reference time from an external source;
means for inputting an offset time instruction related to a time that is offset with respect to the reference time, said offset time instruction being a specific time deviation or new time desired by a user; and
means for executing time-related processing by applying the offset time instruction to the reference time received by the receiving means;
wherein, even for a constantly changing reference time, and using a constant offset instruction, automatically and repeatedly processing a revised display time causes the display time to equal the reference time plus the offset time.

23. The mobile communications terminal of claim 20, wherein the mobile communications terminal is in wireless communication with a remote base station, the remote base station comprising:

a receiver for receiving a signal from a remote transmitter; and a generator for generating the reference time based on signals received by the receiver; and a transmitter for sending a reference time generated by the generator to the mobile communications terminal.

24. The mobile communications terminal of claim 23, wherein the receiving means is structured to receive the reference time from the base station.

25. The mobile communications terminal of claim 22, wherein the transmitter is a global positioning system satellite.

26. A method of generating a display time at a mobile communications terminal, comprising:

generating a terminal time from a time input by a user;

comparing the terminal time to a reference time;

generating a differential based on the step of comparing; and displaying a revised time resulting from a combination of the terminal time and the differential;

wherein, even for a constantly changing reference time, automatically generating the revised time after the user inputs the time, the revised time being repeatedly generated with the same differential, so that the user can maintain a desired differential.

27. The method of claim 26, further comprising the steps of:

receiving signals indicative of the reference time;

generating the reference time based on the received signals; and storing the reference time for use in the step of generating a differential.

28. The method of claim 27, wherein the step of receiving signals comprises receiving remotely-transmitted signals.

29. The method of claim 27, wherein the step of receiving a signal comprises receiving signals generated at the terminal and indicative of the reference time.

30. The method of claim 27, further comprising the steps of:

storing the reference time and the differential prior to the step of displaying; and calculating the revised time based on the stored reference time and the stored differential.

31. A method of generating a display time at a mobile communications terminal, comprising:

receiving an externally-generated reference time, said externally-generated reference time supplied by a user;

storing the externally-generated reference time;

receiving an input offset time instruction, said input offset time instruction being a specific time difference or a new time;

storing the input offset time instruction; and generating a display time based on the stored reference time and the stored offset time instruction;

wherein, even for a constantly changing reference time, generating the display time is automatically performed after the user inputs the offset time instruction, the display time being repeatedly generated with the same input offset time instruction relative to the reference time, so the same time difference with the reference time can be maintained so the display time always reflects the offset time instruction.

32. The method as claimed in claim 31, wherein said input offset time instruction is input by a user typing an instruction consisting of at least one of hours, minutes and seconds of the specific time difference or the new time.

* * * * *